United States Patent
Widt et al.

(10) Patent No.: US 6,595,040 B1
(45) Date of Patent: Jul. 22, 2003

(54) TEST LEAK UNIT

(75) Inventors: Rudi Widt, Köln (DE); Rudolf Flosbach, Wipperfurth (DE)

(73) Assignee: Inficon GmbH (DE)

( * ) Notice: Subject to any disclaimer, the term of this patent is extended or adjusted under 35 U.S.C. 154(b) by 0 days.

(21) Appl. No.: 09/869,746

(22) PCT Filed: Nov. 18, 1999

(86) PCT No.: PCT/EP99/08859

§ 371 (c)(1),
(2), (4) Date: Jun. 29, 2001

(87) PCT Pub. No.: WO00/49380

PCT Pub. Date: Aug. 24, 2000

(30) Foreign Application Priority Data

Feb. 19, 1999 (DE) .......................... 199 06 941

(51) Int. Cl.$^7$ ................................. G01M 3/20
(52) U.S. Cl. .................. 73/40.7; 73/1.02; 73/1.03; 73/1.05; 73/1.06; 73/1.17; 73/1.24; 73/1.25; 73/40
(58) Field of Search ................. 73/1.02, 1.03, 73/1.04, 1.05, 1.06, 1.17, 1.24, 1.25, 1.26, 40.7, 40

(56) References Cited

U.S. PATENT DOCUMENTS

| 3,129,729 A | 4/1964 | Roberts | 141/18 |
| 3,209,579 A | 10/1965 | Roberts | 73/1.04 |
| 3,533,272 A | * 10/1970 | Dahms | 73/1.04 |
| 4,794,784 A | * 1/1989 | Bley | 73/40 |
| 5,663,487 A | * 9/1997 | Widt | 73/1.26 |

FOREIGN PATENT DOCUMENTS

| DE | 2926112 | * 1/1981 | 73/1.04 |
| DE | 3243752 A 1 | 5/1984 | 73/1.26 |
| DE | 3613694 A 1 | 10/1987 | |
| DE | 196 42 099 A 1 | 4/1998 | |

* cited by examiner

Primary Examiner—Daniel S. Larkin
(74) Attorney, Agent, or Firm—Wall Marjama & Bilinski LLP

(57) ABSTRACT

A test leak unit (1) includes a supply of test gas, preferably helium, and an element (14) for determining leakage rates. The aim of the invention is to create a simple, robust and easily refilled test leak unit, especially for detecting packaging leaks. To this end, the test gas supply is stored under substantially atmospheric pressure in a resealable reservoir (2) including a closing part (3), such that when the reservoir (2) is closed, a test gas-impermeable seal is developed between the closing part (3) and the reservoir (2), and the leakage rate-determining element (14) forms part of the closing part (3).

10 Claims, 1 Drawing Sheet

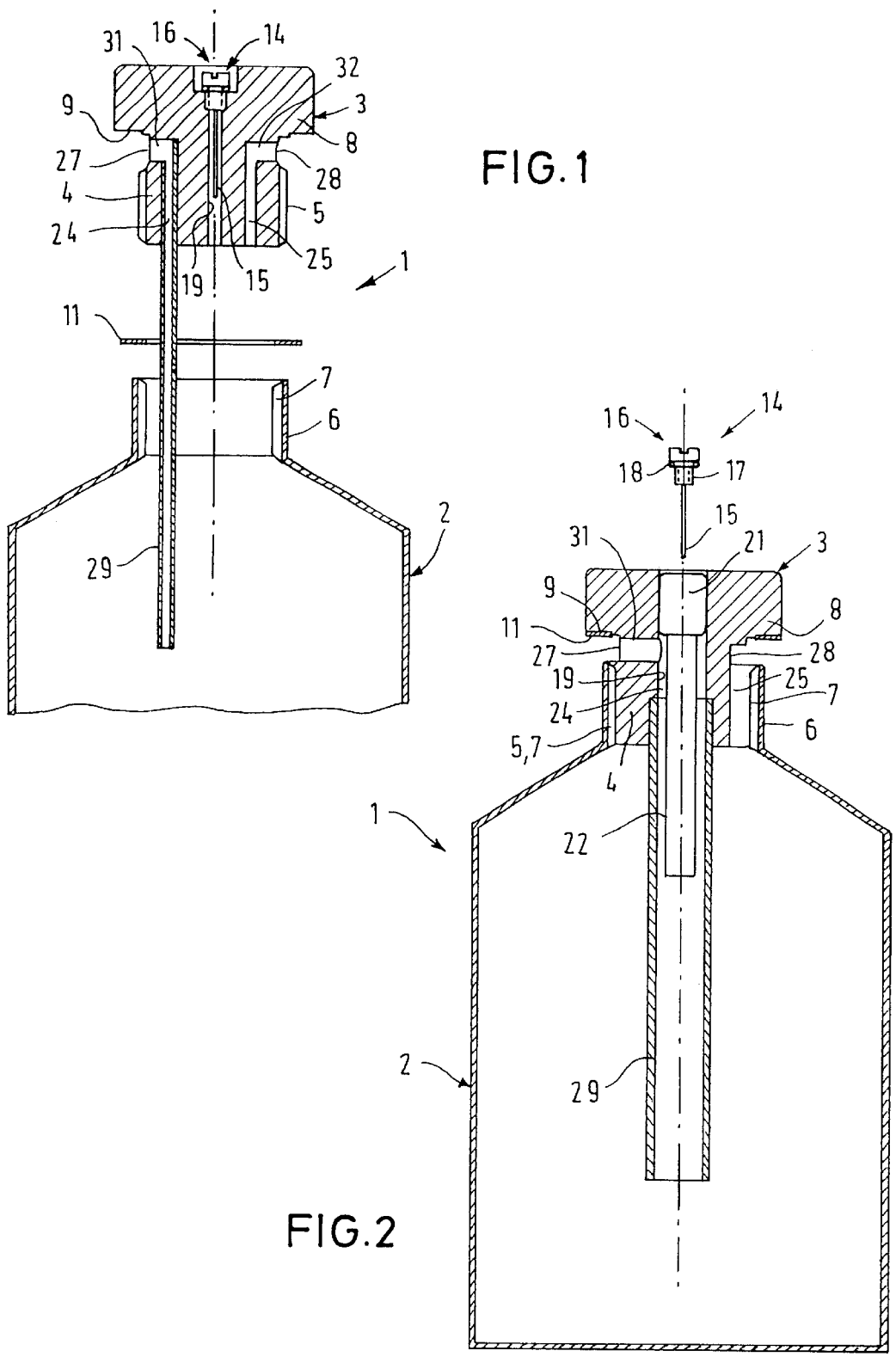

TEST LEAK UNIT

BACKGROUND OF THE INVENTION

The present invention relates to a test leak unit comprising a supply of test gas, preferably helium, and an element for determining leakage rates.

In leak testing of hollow bodies, the method of vacuum test gas leakage detection has prevailed. The wall of the hollow body is exposed to a differential[1] pressure produced by evacuating the hollow body or its surroundings. Test gas, commonly helium, admitted on the side at the higher pressure, penetrates possibly present leaks and is recorded by a test gas detector, for example, a mass spectrometer, connected on the side at the lower pressure.

[1] Translator's note: "The German text states "Differendruck" here whereas "Differenzdruck" would be appropriate. Therefore "Differenzdruck" has been assumed for the translation.

Test leak units of the aforementioned kind are, for example, known from DE-A documents 32 43 752 and 36 13 694. These supply a leakage of known properties and serve the purpose of calibrating leak searching instruments. To this end, they are connected via connecting lines to the leak searching instrument in which a test gas detector is located.

Frequently, such test leak units are built into the leak searching instrument. An other possibility of checking the operation of the leak searching instrument is to hold the test leak unit with its opening, through which the test gas flows out via a leakage rate determining element, in the vicinity of the inlet of the leak searching instrument. The test gas arriving at the test gas detector will then produce the desired test signals.

From WO 98/16809 a process and a device for testing the leak tightness of packages is known. Located within the sealed package is the test gas (preferably helium, also nitrogen, argon, carbon monoxide, halogen gases or the like). The leakage test is performed within a test chamber consisting of foils. For a process and a device of this kind, a test step has already been proposed improving the reliability of the leakage test. This proposal is such that the wall of a unit under test is provided with a leak and that the leak searching process be done with this unit under test itself. Thus one of the units under test itself is being used as the test leak unit. However, checking of a leak searching instrument with a "quasi test leak" of this kind is only possible qualitatively. The magnitude of the leakage produced by piercing is unknown. This equally applied to the concentration of the test gas within the unit under test, which above all may have changed, if the selected unit under test for the "quasi test leak" already had a leakage before.

SUMMARY OF THE INVENTION

It is the task of the present invention to create a simple, robust, and easily refilled test leak unit which is also suited for packaging leak searching instruments.

This task is solved by the present invention in the case of a test leak unit of the aforementioned kind, by storing the test gas reservoir substantially under atmospheric pressure in a resealable reservoir with a closing part, where with the reservoir sealed, test gas tight sealing means are provided between closing part and reservoir and where the leakage rate determining element forms part of the closing part.

Since the pressure in the test gas reservoir is approximately at atmospheric pressure, test gas flows out through the leakage rate determining element only when the test leak unit is placed in a vacuum chamber, i.e. in a leak searching chamber in which the units under test are subjected to a vacuum leakage test. Without a significant change in the concentration of the test gas in the reservoir, many test cycles (for a reservoir of 0.25 liters and helium as the test gas about 10,000) can be run. The fact that the filling pressure in the test leak unit corresponds to the surrounding atmospheric pressure, offers the added benefit that refilling the test leak unit may be performed simply with the aid of a spray gun. An otherwise necessary gas lock is no longer required. Spraying of the test gas into the reservoir has the effect of causing the previously used filling to flow out. In all, relatively large leakage rates may be attained with the test leak unit according to the present invention over a long period of time. In the case of the otherwise common internal pressure far above atmospheric pressure of known test leak units, the reduction in pressure will rapidly cause a change in the leakage rate.

The adaptation of the leakage rate of the test leak unit according to the present invention to the specific process of the customer, may be simply performed by selecting a closing part with the desired leakage rate. If the specific requirements of the customer change, this closing part may be exchanged quickly and simply by a closing part having a different leakage rate.

It is important, that when employing a test leak unit according to the present invention in the vacuum of a leak searching chamber, the test gas will flow out exclusively through the leakage rate determining element. Any further seal, be it the seal between closing part and reservoir or a seal between the leakage rate determining element and the closing part, must provide a tight seal against the test gas. When employing helium as the test gas, PU seals must be used, preferably "Platilon" (company Atochem, Bonn).

A screwed plug preferably serves as the seal between closing part and reservoir. Compared to other closing means (bayonet catch, for example) the desired level of leak tightness against the test gas can be attained particularly well.

Further advantages and details of the present invention shall be explained with reference to the design examples depicted in the drawings wherein:

FIG. 1 is a partial side elevation with portions uploaded away illustrating a first embodiment of the invention; and FIG. 2 is a partial side elevation similar to FIG. 1 illustrating a second embodiment of the invention.

DETAILED DESCRIPTION OF THE INVENTION

Depicted in drawing FIGS. 1 and 2 is each a test leak unit 1 with a reservoir 2 and a closing part 3. The closing part 3 has a section 4 with an outside thread 5. Assigned to this outside thread 5 is an inside thread 7 in the neck 6 of the reservoir 2.

A further section 8 of the closing part 3 has, compared to the section 4 an increased diameter. Its rim is provided with a recess 9 facing the reservoir 2, said recess accepting a sealing ring 11. With the closing part 3 fully screwed into the neck 6 of reservoir 2, the upper rim of the neck 6 is in contact with the sealing ring 11 thereby ensuring the desired degree of leak tightness for reservoir 2.

In both drawing figures the leakage rate determining element is designated as 14. It consists of a quartz capillary 15, which is preferably embraced by a plastic jacket. It is affixed in a holder 16 designed like a spray nozzle with thread 17 and sealing ring 18 (drawing FIG. 2). Elements of this kind are basically known from WO 95/21373.

In the design example according to drawing FIG. 1, the holder 16 is directly screwed into an axial bore 19 in the closing part 3 in such a manner that the capillary 15 penetrates said bore 19 and is linked to the internal chamber of the reservoir 2. In the design example according to drawing FIG. 2 an insert 21 is provided which is cemented in a test gas tight manner into the axial bore 19. Holder 16 is screwable into the insert 21. Part of the insert 21 is a protection tube 22 which surrounds the capillary 15 in its built-in state.

Finally the closing part 3 is equipped with channels 24, 25 serving the purpose of admitting fresh test gas and discharging the gas mixture still present in reservoir 2. Said channels have outer openings 27 and 28 respectively located on the side in section 4 of the closing part 3 and arranged in such a manner that they are accessible when the closing part 3 is partly screwed out of the reservoir 2 (drawing FIG. 2). A tube section 29 follows at the inner opening of the test gas supply channel 24, said tube section extending into the bottom section of the reservoir 2. This ensures that fed in fresh test gas will cause the gas mixture still present in the reservoir 2 to flow out of the discharge channel 25. During filling, the container is preferably placed upside down so that the in flow of lighter helium gas displaces the old gas mixture resp. air down and out.

In the design example according to drawing FIG. 1, the supply and discharge channels 24, 25 are formed by axial bores. These open out into radial bores 31, 32 which form the outer openings.

In the design example according to drawing FIG. 2, the bore 19, which is sealed towards the outside by cemented in insert 21, serves the purpose of a supply channel 24 for the supply of fresh test gas. The discharge channel is created by closing part 3 being flattened at the side within the area of its section 4.

What is claimed is:

1. A test leak unit comprising:

a helium test gas reservoir;

a reclosable reservoir vessel, said reservoir vessel having a closure piece;

a leakage rate-determining element; and a test gas-impermeable sealing means disposed between said closure piece and said reservoir vessel when said reservoir vessel is closed, said test gas reservoir being maintained substantially at atmospheric pressure in said reclosable reservoir vessel and said leakage rate-determining element being a component of said closure piece, said closure piece being equipped with inflow and outflow channels to permit replenishment of said vessel with new test gas.

2. A leak test unit according to claim 1, wherein the closure between the reservoir vessel and the closure piece is developed as a screw connection.

3. A leak test unit according to claim 2, wherein outer terminations of the inflow and outflow channels are disposed laterally on said closure piece, such that said channels are closed when the reservoir vessel is closed.

4. A leak test unit according to claim 1, including a tube section extending into the lower portion of the reservoir vessel, said tube section adjoining an inner termination of the inflow channel.

5. A leak test unit according to claim 1, wherein said closure piece includes a bore, said leakage rate-determining element being accommodated in said bore.

6. A leak test unit according to claim 5, wherein said leakage rate-determining element is comprised of a quartz capillary sheathed in a synthetic jacket, said element being secured within a mounting and resembling a spray-nozzle.

7. A leak test unit according to claim 6, wherein said mounting is screwed into the bore of said closure piece.

8. A leak test unit according to claim 5, including an insert disposed within said bore into which said leakage rate-determining element can be screwed.

9. A leak test unit according to claim 6, including a protective tube provided for the quartz capillary of the leakage rate-determining element.

10. A leak test unit according to claim 1, wherein said closure piece includes a recess for a sealing ring, said sealing ring being in contact with an upper edge of a neck of the reservoir vessel after said vessel has been closed.

* * * * *